United States Patent
Ando et al.

[11] Patent Number: 6,034,588
[45] Date of Patent: Mar. 7, 2000

[54] SUPERCONDUCTING CURRENT LEAD

[75] Inventors: Toshinari Ando; Hiroshi Tsuji; Takaaki Isono; Kazuya Hamada, all of Ibaraki; Yukio Yasukawa; Masanobu Nozawa, both of Ciba, all of Japan

[73] Assignees: Japan Atomic Energy Research Institute, Tokyo; Fuji Electric Co., Ltd., Kanagawa, both of Japan

[21] Appl. No.: 09/153,695

[22] Filed: Sep. 15, 1998

[30] Foreign Application Priority Data

Mar. 16, 1998 [JP] Japan .................................. 10-065146

[51] Int. Cl.⁷ .................................................. H01B 12/00
[52] U.S. Cl. ...................... 335/216; 174/125.1; 505/230; 505/231; 505/232; 505/704; 505/879; 505/884; 505/886
[58] Field of Search .......................... 335/216; 174/15.4, 174/15.5, 125.1; 505/166, 211, 212, 213, 230, 231, 232, 704, 705, 879, 880, 884, 885, 886, 887

[56] References Cited

U.S. PATENT DOCUMENTS 5,276,281  1/1994  Sato et al. ............................ 174/125.1

FOREIGN PATENT DOCUMENTS 4-218215  10/1962  Japan .

*Primary Examiner*—Lincoln Donovan
*Assistant Examiner*—Raymond Barrera
*Attorney, Agent, or Firm*—Pearne, Gordon, McCoy & Granger LLP

[57] ABSTRACT

A superconducting current lead is provided, in which a plurality of unit conductors serving as current paths and each formed from a tape-like oxide superconducting wire are disposed on a cylindrical support member 4 so that a tape surface of the superconducting wire material is made parallel with a circumferential direction in a cylindrical coordinate system, and magnetic members 3 are disposed between the plurality of unit conductors.

15 Claims, 7 Drawing Sheets

CASE WHERE NO MAGNETIC MATERIAL IS
DISPOSED BETWEEN UNIT CONDUCTORS

CASE WHERE MAGNETIC MATERIAL IS
DISPOSED BETWEEN UNIT CONDUCTORS

DIRECTION PERPENDICULAR TO TAPE SURFACE

DIRECTION PARALLEL WITH TAPE SURFACE

CASE WHERE NO MAGNETIC MATERIAL IS DISPOSED BETWEEN UNIT CONDUCTOR

DIRECTION PERPENDICULAR TO TAPE SURFACE

DIRECTION PARALLEL WITH TAPE SURFACE

CASE WHERE MAGNETIC MATERIAL IS DISPOSED BETWEEN UNIT CONDUCTOR

SUPERCONDUCTING CURRENT LEAD

BACKGROUND OF THE INVENTION

1. Field of the Invention

The present invention relates to a superconducting current lead for supplying a current from an electric source placed in a room temperature to a superconducting apparatus such as a superconducting magnet cooled to a very low temperature.

2. Description of the Related Art

Superconducting magnets are used for physical property researches and for magnetic resonance systems, etc., and they are intended to be applied to magnetic levitated trains, nuclear-fusion magnetic containment systems, etc. in the future. In each of these superconducting magnets placed in a very low temperature, there arises a problem that heat enters a very low temperature region when the superconducting magnet is supplied with a current from an electric source placed in a room temperature. For example, liquid helium is an expensive liquid, which is not less than 1000 yen per liter. Refrigerator-input electric power necessary for a refrigerator to re-liquefy helium vaporized by heat entrance of 1 W is about 400 W even in an ideal state, but it reaches 1000 W in actual circumstances. For this reason, if there is a large quantity of heat entrance through a current lead, not only the cost of liquid helium, is increased but also the size or capacity of the refrigerator required for re-liquefying helium is increased. Hence, Such a situation makes the current leads meaningless since a superconducting magnet system including the current leads aims at the size reduction and power saving.

Therefore, the development of a low heat-entrance type current lead has become an important theme. After an oxide superconducting material was found out, a current lead using the oxide superconducting material in the low-temperature side of the current lead has been developed for reducing the quantity of heat entrance into a very low-temperature portion. For example, JP-A-64-76707 discloses such a superconducting current lead as follows. An intermediate portion of a current lead for supplying a current to a superconducting apparatus in liquid helium is used as a thermal anchor for cooling the portion of the current lead to the temperature of liquid nitrogen. A superconductor (such as Y—Ba—Cu—O) having a critical temperature not lower than the boiling point (78 K) of liquid nitrogen is used as a material for a lead portion lower than the thermal anchor portion. The temperature of the superconductor portion is always kept so as to be not higher than the critical temperature to thereby prevent the destruction of superconductivity. Further, JP-A-5-109530 discloses such a superconducting current lead as follows. The superconducting current lead is constituted by various kinds of conductors; for example, three kinds of conductors each disposed in a low-temperature portion, in an intermediate-temperature portion and in a high-temperature portion. Connection members in their longitudinal direction connect these portions. The low-temperature portion, the intermediate-temperature portion and the high-temperature portion are different from one another in shape, superconducting characteristic (critical current density (Jc), critical temperature, resistance value at the time of current conduction with current density larger than Jc, and their dependencies on the magnetic field or temperature) and structure. For example, conductor materials for the low-temperature portion, the intermediate-temperature portion and the high-temperature portion are as follows. A material in which a Bi-based oxide superconductor layer having high critical current density at 4.2 K is provided, through a thin layer of Ag, on an electrically insulating substrate having low heat-conductivity as a reinforcing material, is used as a conductor of the low-temperature portion. A conductor, in which tape-like wires each having a core of an oxide superconductor coated with a coating material are laminated and collected, is used as a conductor of the intermediate-temperature portion. An Y-based oxide superconductor having high critical current density (Jc) at 77 K is used as the core in the intermediate-temperature portion. A Au alloy containing a small amount of Pd is used as the coating material in the intermediate-temperature portion in order to suppress heat entrance. A conductor, in which tape-like wires are laminated and collected in the same manner as in the intermediate-temperature portion, is used as a conductor of the high-temperature portion. A Tl-based oxide superconductor having a high critical temperature is used as a core of the high-temperature portion. Ag having a small resistance value is used as a coating material of the high-temperature portion. In this manner, a material having low heat-conductivity is used in the vicinity of the superconducting magnet to thereby reduce heat entrance caused by heat conduction. Further, JP-A-4-218215 discloses such a superconducting current lead as follows. Silver-sheathed oxide superconductors and a pipe of FRP or a pipe of a metal such as silver, copper, aluminum, nickel, stainless steel, or the like, or an alloy of these metals as a support member to be combined with the oxide superconductor are provided. The oxide superconductors are bonded to the pipe by an adhesive agent or wound on the pipe with a Teflon tape, or the like, so as to be fixed onto the pipe. Accordingly, the oxide superconductors and the support member are designed so as to move as one at the time of thermal expansion or contraction. As a result, the critical current density is not reduced even in the case where the temperature changes. Thus, superconductors exhibiting excellent characteristics in repeated temperature cycles are provided. In this case, the oxide superconductors are disposed in parallel or helical with the longitudinal direction of the current lead.

On the other hand, in most cases, the high-temperature side of the current lead is constituted by a copper lead.

The conventional current lead using oxide superconductors, however, has the following problem. As the capacity of the current lead increases, that is, as the current value flowing in the current lead increases, the intensity of the self magnetic field generated by the current lead per se increases. In either a bismuth-based material or an yttrium-based material used as the superconducting material, the critical current value decreases remarkably in the magnetic field. For this reason, in a large-current-purpose current lead using a bulk-shaped superconducting material where critical current density is uniform in the material, the required sectional area of the superconducting material increases. Accordingly, there arises a disadvantage that the increase of the required sectional area causes not only increase in size of the superconducting current lead portion and complication in structure of the superconducting current lead portion, but also increase in quantity of heat entrance. In the prior art, attention has been never paid to the problem in the lowering of the critical current value caused by the self magnetic field.

SUMMARY OF THE INVENTION

The present invention is designed to solve the aforementioned problem and an object thereof is to provide a superconducting current lead in which not only the critical current value is prevented from being reduced but also the size of the superconducting current lead is reduced.

The basic feature of the present invention is to provide a current lead in which magnetic materials are disposed between the tape-like superconducting wire materials to suppress the magnetic field component perpendicular to the tape surface to thereby suppress deterioration of the critical current value caused by a self magnetic field, by making use of a characteristic that the critical current value of each of tape-like superconducting wire (for example, oxide superconducting wire each coated with silver) is not so reduced by a magnetic field applied perpendicularly to the direction of the current and in parallel with a tape surface.

That is, according to the present invention, a plurality of unit conductors each formed from a tape-like oxide superconducting wire are disposed on a cylindrical support member so that a tape surface of each superconducting wire is parallel with a circumferential direction in a cylindrical coordinate system. Accordingly, the main component of a self magnetic field generated by a self current becomes parallel with the tape surface of each superconducting wire. As a result, lowering of the critical current value caused by the self magnetic field can be suppressed to a certain degree. Furthermore, magnetic members are disposed between the unit conductors to suppress a magnetic field component perpendicular to the tape surface in a non-center portion in a section of the superconductor to thereby suppress the lowering of the critical current value. Accordingly, the critical current value can be kept high.

DETAILED DESCRIPTION OF THE PREFERRED EMBODIMENTS

Embodiments of the present invention is described below in detail with reference to the accompanying drawings, but the present invention is not limited to the embodiments.

In the present invention, a superconductor used as a silver-sheathed superconducting wire, such as a bismuth-based material (Bi—Sr—Ca—Cu—O) or an yttrium-based material (Y—BaCu—O), or the like, is preferably used as a tape-like oxide superconducting wire. In this case, the ratio of the sectional area of silver to the sectional area of the superconductor is preferably in a range of from about 2 to about 3, but it may be about 1.

Figure 1:
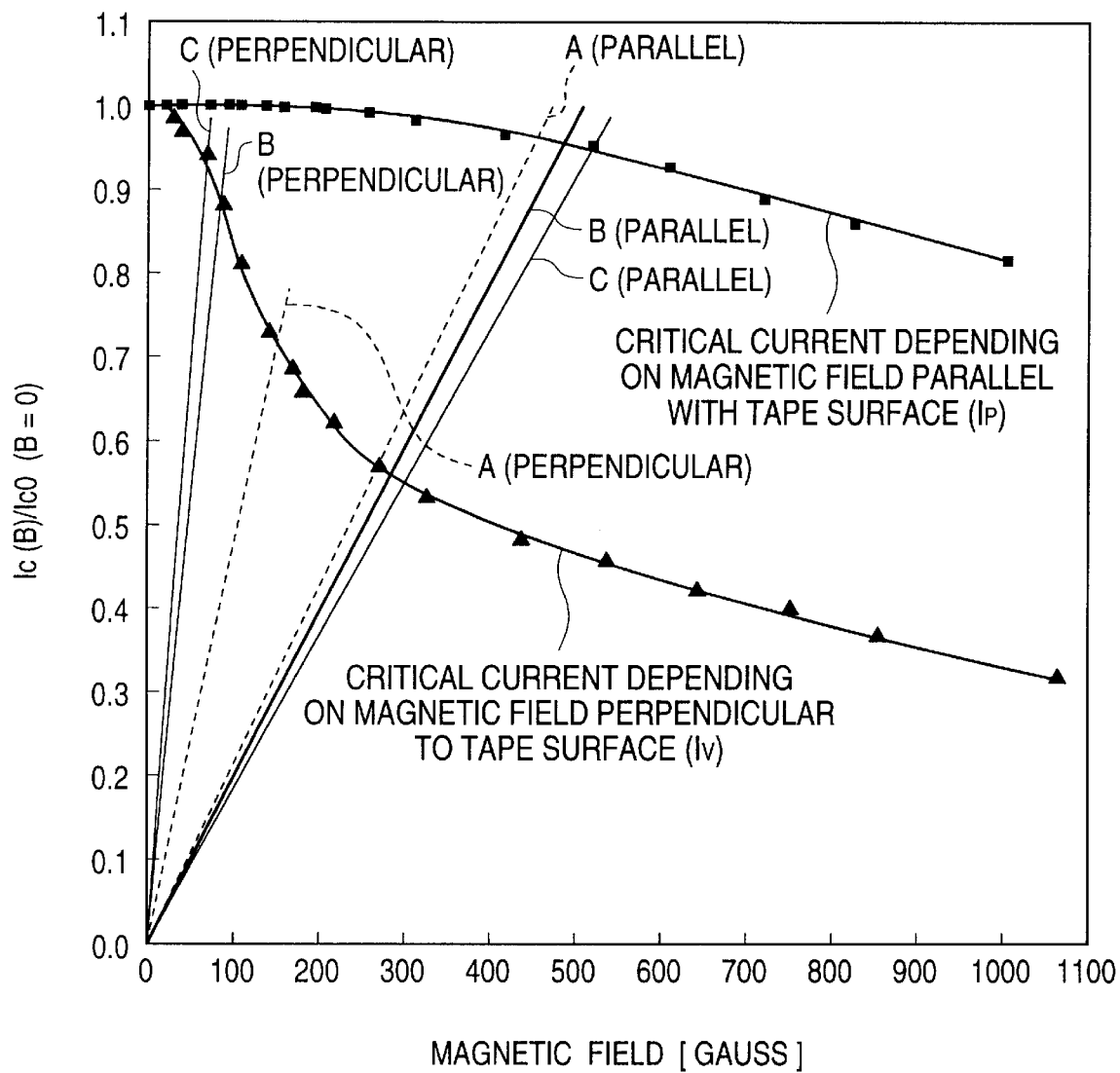
FIG. 1 is a graph showing the dependency of the critical current value on the applied magnetic field in a bismuth-based silver-sheathed type tape-like oxide superconducting wire.

FIG. 1 is a graph showing the relationship between an applied magnetic field and a critical current value in a bismuth-based silver-sheathed type tape-like oxide superconducting wire. In FIG. 1, Ip shows a curve expressing the change of the critical current value dependent on a magnetic field parallel with a tape surface, and Iv shows a curve expressing the change of the critical current value dependent on a magnetic field perpendicular to the tape surface (that is, a magnetic field in the direction of the thickness of the tape). In the ordinate axis, the critical current value is expressed by the ratio of the critical current value Ic(B) in the applied magnetic field B to the critical current value Ic0 in the zero magnetic field (B=0) As shown in FIG. 1, the critical current value in the case where a magnetic field of 100 gausses is applied in the direction perpendicular to the tape surface is reduced to a range of from 80% to 90% compared with the case where no magnetic field is applied. The critical current value in the case where a magnetic field of about 500 gausses is applied in the direction perpendicular to the tape surface is reduced to 50% or less compared with the case where no magnetic field is applied. On the contrary, the critical current value in the case where a magnetic field of 500 gausses is applied in the direction parallel with the tape surface is kept 95% compared with the case where no magnetic field is applied. That is, the critical current value in the tape-like oxide superconducting wire has remarkable unisotropy with respect to the direction of applied magnetic field as described above. Here, the value of 500 gausses is substantially equal to the value of a self magnetic field, which is generated by a 10 kA-class oxide superconductor current lead. Incidentally, a metal, which does not make an undesirable reaction with the oxide superconductor, may be used as a sheath material (stabilizing metal). For example, silver or a silver alloy can be used as the sheath material. A silver alloy containing gold may be particularly preferably used as the sheath material.

Figure 2:
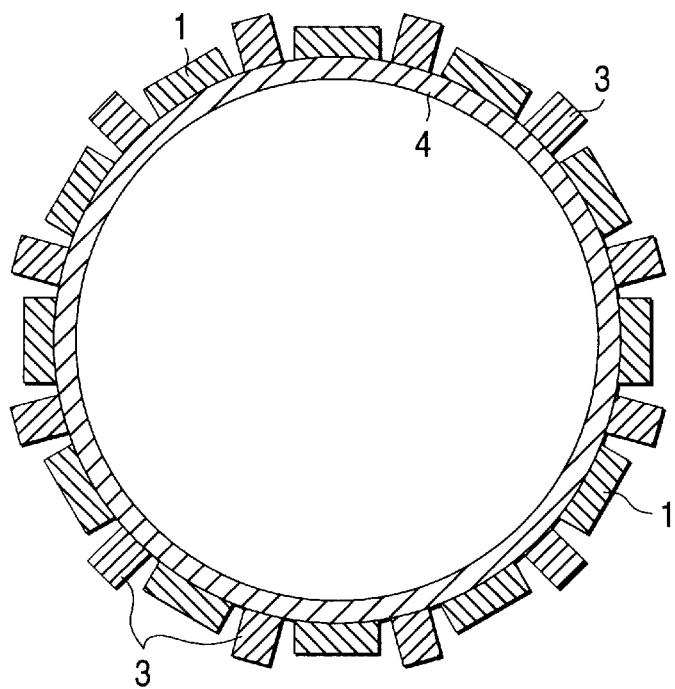
FIG. 2 is a cross-sectional view of a superconducting current lead in a first embodiment of the present invention.
Figure 3:
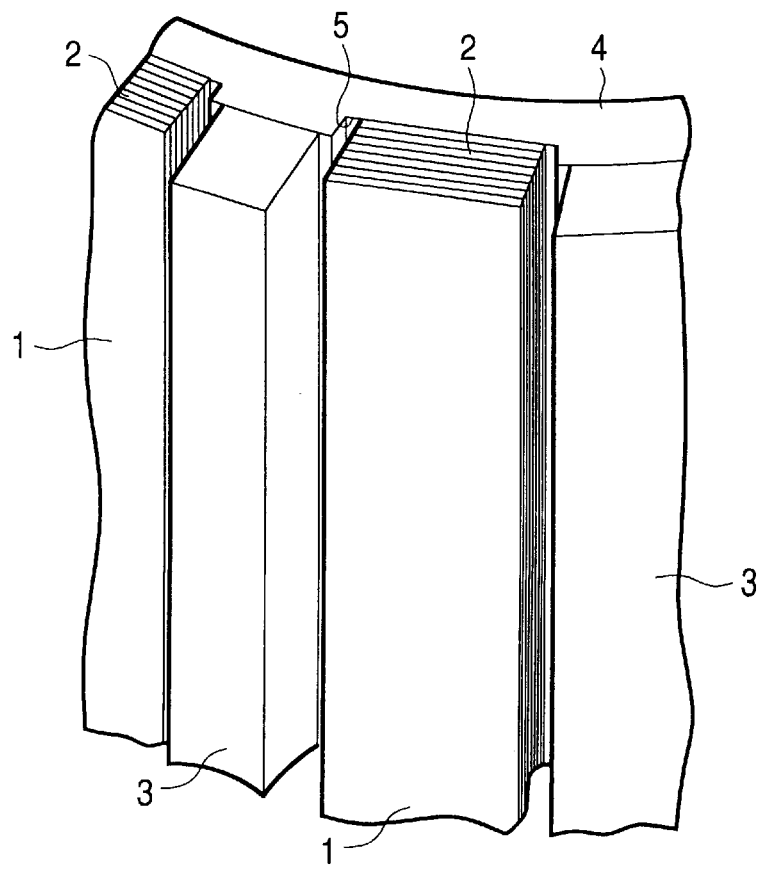
FIG. 3 is a partly enlarged perspective view of the superconducting current lead depicted in FIG. 2.
Figure 9:
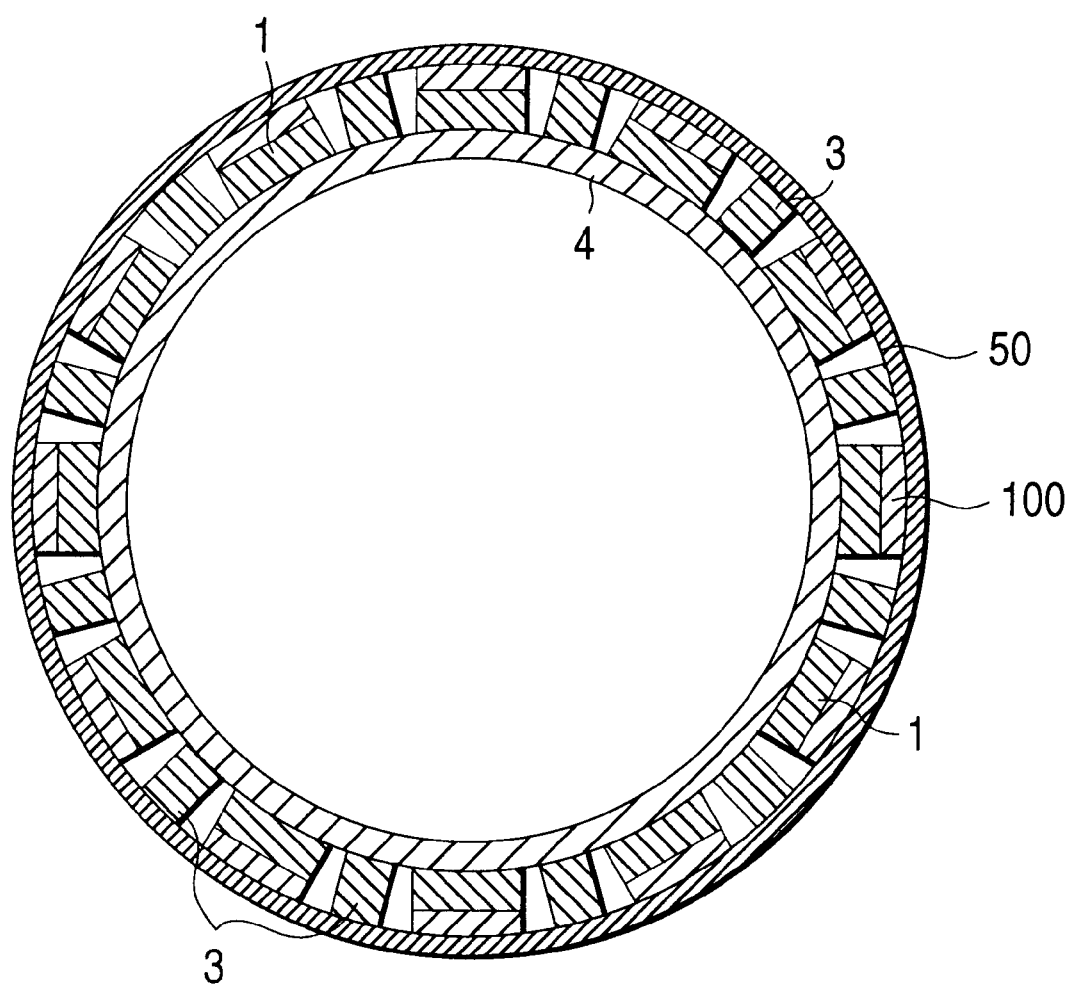
FIG. 9 is a cross-sectional view of a superconducting current lead in a first embodiment of the present invention.

FIG. 2 and FIG. 9 show a cross-sectional view of the superconducting current lead in the first embodiment of the present invention. FIG. 3 is a partly enlarged perspective view of the superconducting current lead of FIG. 2. As shown in FIGS. 2 and 3, united tape-like oxide superconducting wires, that is, unit conductors 1 are disposed on the outer circumference of a cylindrical support member 4 so that tape surfaces of the unit conductors 1 are parallel with a circumferential direction in a cylindrical coordinate system. Further, magnetic members 3 are disposed between the unit conductors 1. Although FIG. 3 shows the case where each of the unit conductors 1 is constituted by a laminate of eight single wires 2 of a tape-like oxide superconducting wire, each of the unit conductors 1 may be constituted by a single wire or by a laminate of single wires of any number other than 8. The tape-like oxide superconducting wire serves as a current path for the current lead. One end portion of the superconducting wire in the longitudinal direction forms a high-temperature end (generally, 77 K) and the other end of the superconducting wire forms a low-temperature end (4.2 K) connected to a superconducting magnet, or the like. Although FIGS. 2 and 3 show the case where each of the magnetic members 3 is shaped like a rectangle in section, the sectional shape of each of the magnetic members 3 is not limited specifically.

The support member 4 is formed from a low thermal-conductivity material. The thermal conductivity in the low-temperature end portion of the current lead is preferably not higher than 1 W/(m–K). Examples of the low thermal-conductivity material used for the support member include stainless steel, a nickel alloy, a titanium alloy, FRP, etc. Examples of the material used for the magnetic members 3 include iron, silicon steel, inconel, incolloy, etc. In the case of pure iron, the magnetic members 3 are disposed only in the high-temperature side (for example, a half of the length of the current lead) of the current lead in order to prevent the entrance of heat into the low-temperature end portion because the thermal conductivity of pure iron is more than ten times higher than the thermal conductivity of stainless steel.

Further, the unit conductors 1 are preferably brought into close contact with the support member 4 so that the contact resistance of the interface between the unit conductors 1 and the support member 4 becomes sufficiently small electrically and thermally. In this case, integration by binding from the outer circumference side or diffusion bonding is effective. By the aforementioned configuration in which the contact resistance between the unit conductors 1 and the support member 4 is made particularly small, the following effect can be achieved.

That is, when the superconducting state of the superconductor transits to a normal conducting state (quenching), a current flows in silver that is a stabilizing metal. In this case, the temperature of the silver-sheathed type tape-like oxide superconducting wire rises by Joule heating. In the aforementioned configuration, however, the temperature rise can be suppressed sufficiently because the support member 4 and the silver-sheathed type tape-like oxide superconducting wire of the unit conductors 1 are in a thermally sufficient contact state so that not only the silver-sheathed type tape-like oxide superconducting wire of the unit conductors 1 but also the support member 4 contributes to heat capacity.

The configuration of a portion in which the unit conductors 1 and the magnetic members 3 are disposed on the support member 4 will be described below in detail.

In this embodiment of the present invention, grooves 5 are formed along places for arrangement of the unit conductors 1 in an outer surface of the cylindrical support member 4. Each of the grooves 5 has a flat bottom surface in accordance with the flat shape of the unit conductors 1 so that the unit conductor 1 is seated on the bottom of the groove 5.

The unit conductors 1 disposed in the grooves 5 are fixed to the support member 4 by a binding tape 50 which is not shown but is provided so as to be wound on the outer circumference of the support member 4. Because the unit conductors 1 are fixed by a binding tape as described above, an adhesive agent is not required to be provided between the unit conductors 1 and the bottoms of the grooves 5 of the support member 4, but such an adhesive agent may be provided. In the case where an adhesive agent is provided in this portion, if an adhesive agent having high thermal-conductivity is used, the thermal conducting efficiency between the unit conductors 1 and the support member 4 is made good and the heat capacity of the support member 4 is effectively utilized for suppressing the temperature rise in the event of quenching. If the unit conductors 1 are tightened by a binding tape 50 from the outer circumference of the unit conductors 1 even in the case where the unit conductors 1 are bonded to the support member 4 by an adhesive agent, the fixture of the unit conductors 1 to the support member 4 can be made firmer.

Because the flatly shaped unit conductors 1 are disposed on the flat bottoms of the grooves 5 provided in an outer surface of the cylindrical support member 4 as described above, the whole of a major surface of each unit conductor 1 is brought into contact with the support member 4 to thereby make the thermal conducting efficiency good between the unit conductor 1 and the support member 4 and to effectively utilize the heat capacity of the support member 4 for suppressing the temperature rise in the event of quenching. Further, because the whole of a major surfaces of each unit conductor 1 is brought into contact with the support member 4 as described above, the critical current value is not reduced by distortion of the tape-like oxide superconducting wire caused by deformation of the unit conductor 1 when the unit conductor 1 is fixed to the support member 4 by a binding tape wound on the outer circumference of the unit conductors 1.

Further, the invention may be applied also to the case where places for arrangement of the unit conductors 1 are chamfered flatly with no groove formed on an outer surface of the cylindrical support member 4. In addition, the invention may be applied to the case where flatly shaped unit conductors 1 are disposed on the cylindrically curved surface of the support member 4 without formation of any groove and without chamfering while gaps between the support member 4 and the unit conductors 1 are filled with an adhesive agent.

The magnetic members 3 disposed between the unit conductors 1 are bonded, by an adhesive agent, to cylindrically curved surface portions which are left between the grooves 5 provided in the outer surface of the support member 4. The adhesive agent for the magnetic members 3 is not required to have high thermal conductivity because the magnetic members 3 are not used as a heat capacity for suppressing the temperature rise in the event of quenching. Alternatively, the outer surface of the cylindrical portion of the support member 4 may be chamfered flatly so that the magnetic members 3 are mounted on the flatly chamfered portions.

Generally, the diameter of the outer circumference of the unit conductors 1 provided on the outer surface of the support member 4 is different from the diameter of the outer circumference of the magnetic members 3 provided on the outer surface of the support member 4. In the case where the unit conductors 1 and the magnetic members 3 are fixed by a binding tape from the outer circumference, non-magnetic members 100 are put on the outer circumference side of the unit conductors 1 which is smaller in the diameter of the outer circumference so that the height of the unit conductors 1 is adjusted to the height of the magnetic members 3, as shown in FIG. 9.

Figure 4:
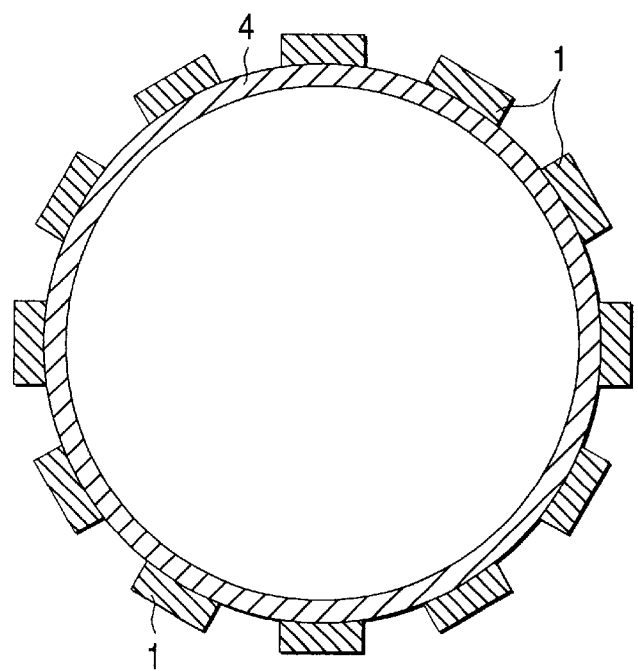
FIG. 4 is a cross-sectional view of a superconducting current lead as a comparative example.

Referring to FIG. 1 again, load lines exhibiting the relationship between a current flowing in the superconducting wire material and a self magnetic field caused by the current conduction in the superconducting wire material are expressed as six straight lines in addition to the aforementioned curves exhibiting the critical current value. The broken line A(perpendicular), solid line B(perpendicular) and solid line C(perpendicular) are load lines showing relationship between current and self magnetic field component perpendicular to the tape surface, and the broken line A(parallel), solid line B(parallel) and solid line C(parallel) are load lines showing relationship between current and self magnetic field component parallel to the tape surface. The broken line A (perpendicular) and the broken line A (parallel) are load lines in the comparative case where no magnetic member 3 is provided as shown in FIG. 4, that is, in the case where the current lead is constituted only by the unit conductors 1 and the support member 4. The critical current value is calculated as an intersection of the load line and the curve (Ip, Iv) expressing the change of the critical current value caused by the magnetic field. In the case where the critical current value based on the magnetic field perpendicular to the tape surface is different from the critical current value based on the magnetic field parallel with the tape surface, lower one is employed as the critical current value. When there is no magnetic member 3, the critical current value Ic is 71% of Ic0 (the critical current value at zero magnetic field). On the other hand, the solid line B (perpendicular) and the solid line B (parallel) among the four solid lines in FIG. 1 are load lines in this embodiment. In this case, the critical current value Ic is 90% of Ic0. That is, when the magnetic members 3 are disposed between the unit conductors 1, a self magnetic field component in the direction perpendicular to the tape surface is led into the magnetic members 3 so as to be suppressed and thereby prevent lowering of the critical current value. As a result, stable current conduction can be performed in a state in which the critical current value is kept high.

Figure 5:
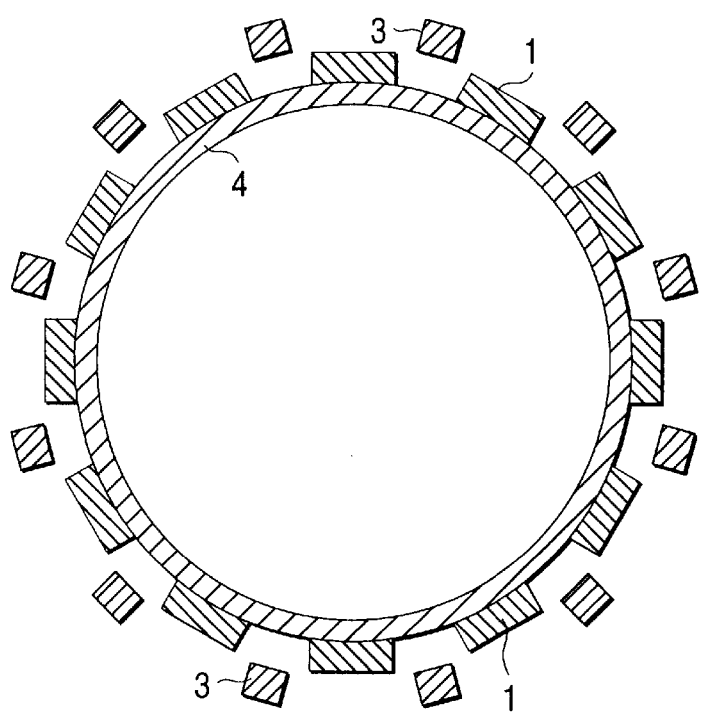
FIG. 5 is a cross-sectional view of a superconducting current lead in a second embodiment of the present invention.

FIG. 5 is a cross-sectional view of a superconducting current lead in a second embodiment of the present invention. The magnetic members 3 are disposed between the unit conductors 1 in the circumferential direction of the support member 4 and are located in the outside of the outermost circumference of the unit conductors 1 in the radial direction of the support member 4. Non-magnetic bodies of stainless steel, or the like, not shown in FIG. 5 are disposed on the support member 4. The magnetic members 3 are fixed onto the non-magnetic bodies. Although FIG. 5 shows the case where each of the magnetic members 3 is shaped like a rectangle in section, the sectional shape of each of the magnetic members 3 is not limited to such a rectangle. If the magnetic members 3 are disposed in such a manner as shown in this embodiment of the present invention, it is possible to suppress most effectively the component perpendicular to the tape surface of the self magnetic components generated in the unit conductors 1. The solid line C (perpendicular) and the solid line C (parallel) in FIG. 1 are load lines in this embodiment. In this case, the critical current value Ic reaches 94% of the critical current value Ic0 (the critical current value at zero magnetic field). That is, by the configuration in this embodiment, the lowering of the critical current value is prevented so that stable current conduction can be performed in a state in which the current value is kept high.

Examples of this invention are described below with reference to the above embodiments.

EXAMPLE 1

Figure 6:
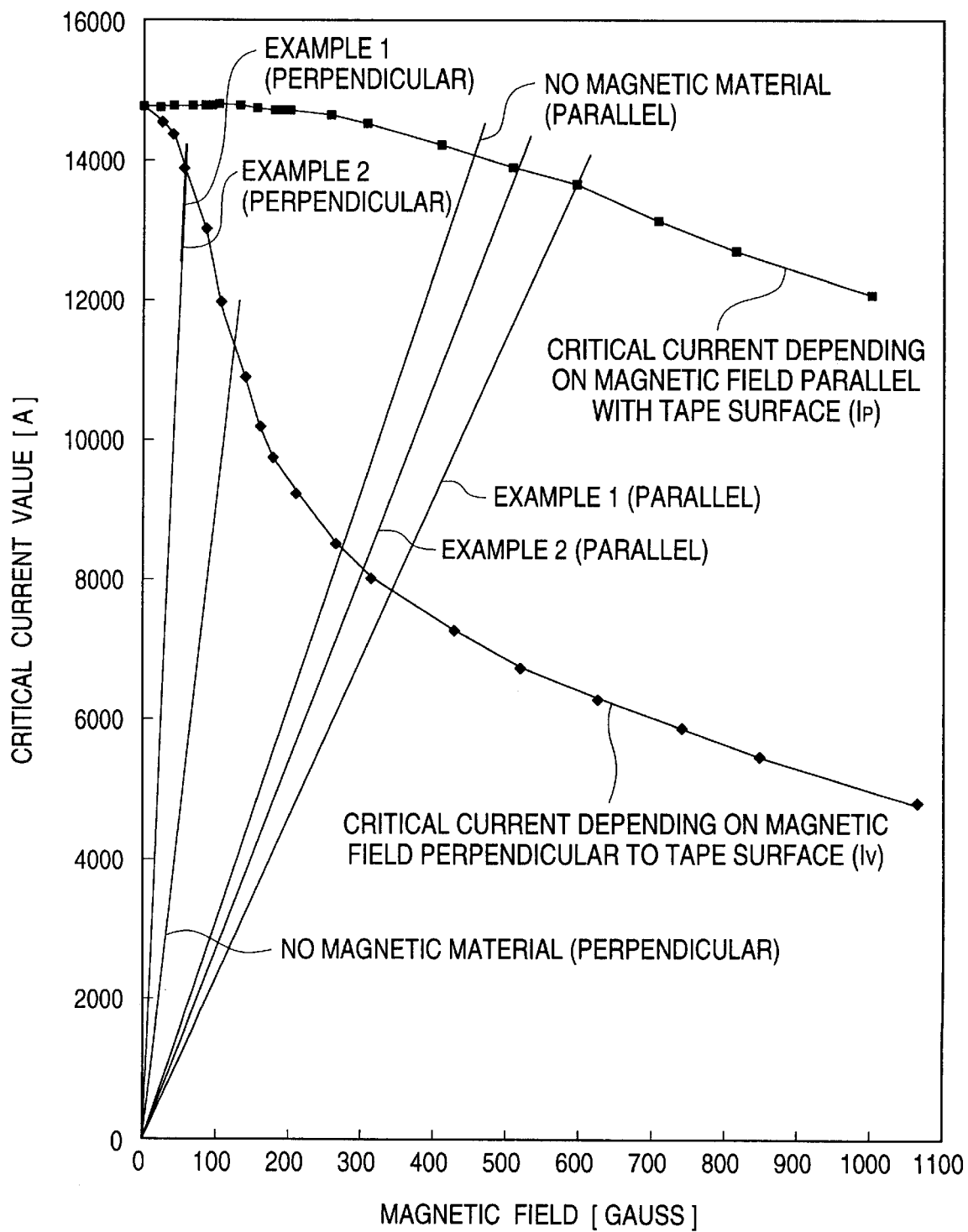
FIG. 6 is a graph showing the dependency of the critical current value on the applied magnetic field in the configurations of conductors in Examples 1 and 2.
Figure 7A:
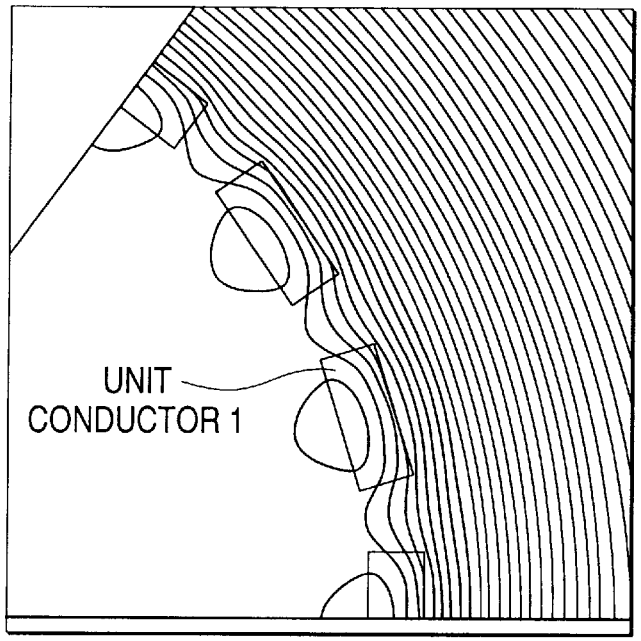
FIGS. 7A and 7B are views of equi-magnetic potential lines in section of unit conductors and in the vicinity of the unit conductors.
Figure 7B:
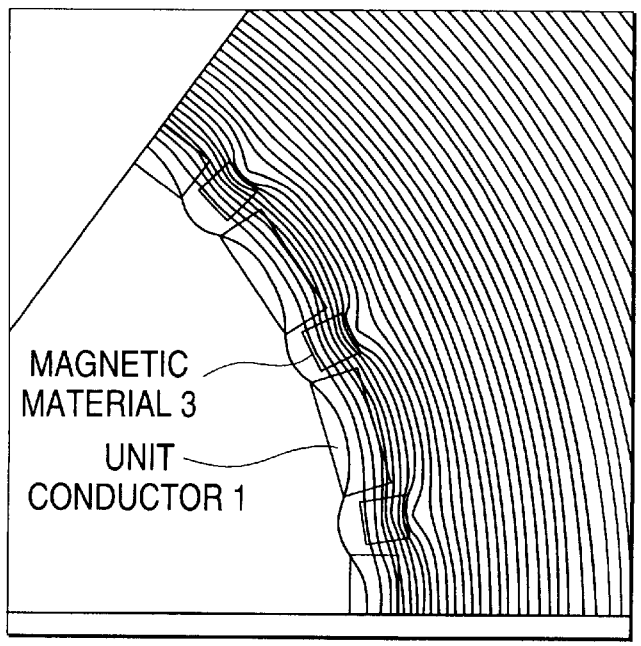
Figure 8A:
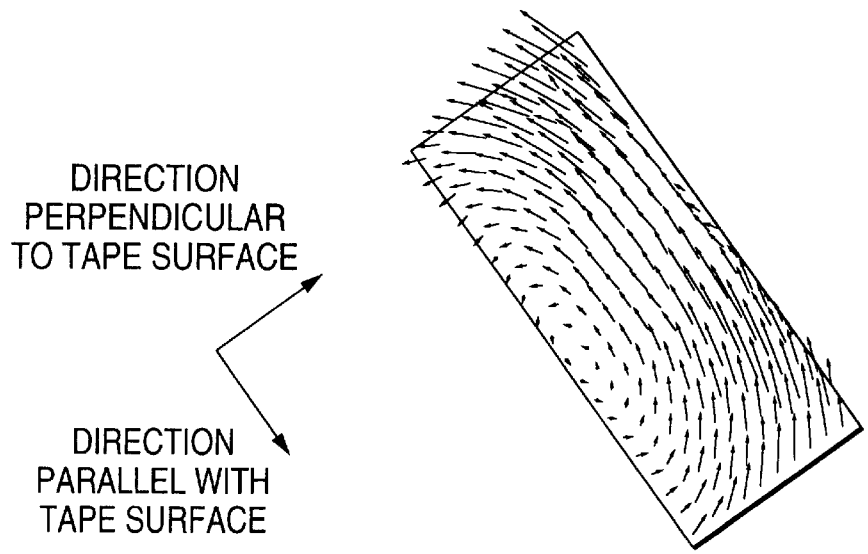
FIGS. 8A and 8B are views of magnetic field vectors in section of the unit conductors.
Figure 8B:
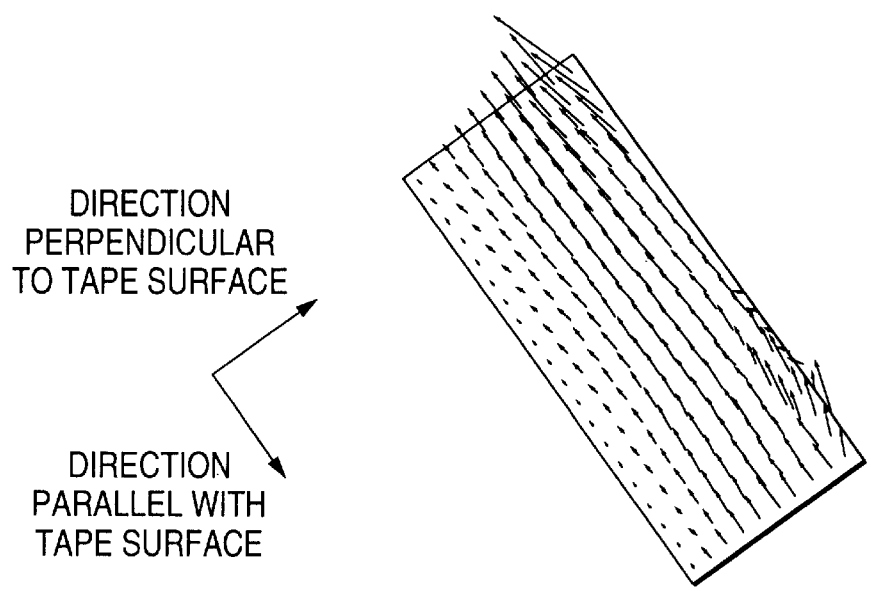

A tape-like superconducting wire including superconducting core material of $Bi_2Sr_2Ca_2Cu_3O_X$ was used in Example 1. The superconducting wire had a width of 5 mm and a thickness of 0.3 mm as a sectional size. The ratio of the sectional area of silver to the sectional area of the superconducting core material was about 2.5 to 1. The critical current value of the superconducting wire was about 70 A at 77 K. When eight sheets of the superconducting wire as described above were laminated to form one unit (called "unit conductor"), the critical current value per unit conductor was 420 A which was not equal to eight times as much as the critical current value per single wire. This is because a self magnetic field component in the direction perpendicular to the tape surface increases as the number of laminated single wires increases and the critical current is sensitive to the magnetic field component in the direction perpendicular to the tape surface. In the case where twenty-four unit conductors as described above were disposed on a 60 mm-diameter stainless steel cylinder so that the tape surface was parallel with the direction of the circumference of the cylinder, the self magnetic field (average) in section of the unit conductors was 110 gausses in the perpendicular direction and 323 gausses in the parallel direction when the current value was 10000 A. The dependence of the critical current value on the applied magnetic field in the aforementioned configuration is shown in a graph in FIG. 6. The critical current value calculated from the aforementioned self magnetic field distribution on the basis of the load line in FIG. 6 is 11360 A which is an intersection of the curve of the critical current value based on the magnetic field perpendicular to the tape surface and the load line. In the case where magnetic members 3 each formed of a soft iron piece having a sectional size of 2.3 mm×2.7 mm were disposed directly on an outer surface of the support member 4 and between the unit conductors so that the 2.3 mm portions were parallel with the direction of the circumference of the cylinder as shown in FIG. 2, the self magnetic field (average) in section of the unit conductors 1 was 46 gausses in the perpendicular direction and 438 gausses in the parallel direction when the current value was 10000 A. FIG. 7A is a view showing equi-magnetic potential lines in the case where no magnetic member 3 was provided. The equi-magnetic potential lines are parallel with lines of magnetic force. FIG. 7B is a view showing equi-magnetic potential lines in the case where magnetic members 3 were disposed between the unit conductors 1. In the case where only the unit conductors 1 were provided, it is apparent that the potential lines changed greatly in the unit conductors 1. In the case where the magnetic members 3 were disposed between the unit conductors 1, it is apparent that the magnetic potential lines were attracted by the magnetic members 3 while the density of the potential lines in the magnetic members 3 was high. The two cases will be compared with respect to magnetic field vectors in the unit conductors 1. FIG. 8A is a view of magnetic field vectors in the case where only the unit conductors 1 were provided. FIG. 8B is a view of magnetic field vectors in the case where the magnetic members 3 were disposed between the unit conductors 1. It is apparent from FIGS. 8A and 8B that, in the case where no magnetic member 3 was provided (FIG. 8A), the magnetic field was generated so as to be whirled in the conductors and the magnetic field component in the direction perpendicular to the tape surface was considerably intense. It is also apparent from FIGS. 8A and 8B that, in the case where the magnetic members 3 were disposed between the unit conductors 1 (FIG. 8B), the magnetic field component perpendicular to the tape surface was reduced. In the case where the magnetic members 3 were disposed between the unit conductors 1, the critical current value was calculated as 13640 A on the basis of the load line in FIG. 6. That is, the critical current value in the case where the magnetic members 3 were disposed between the unit conductors 1 was increased by 20% compared with the case where no magnetic member 3 was provided.

EXAMPLE 2

The same stainless steel cylinder as in Example 1 was used as a support member 4. Twenty-four unit conductors 1 formed in the same manner as in Example 1 were disposed on the support member 4. Magnetic members 3 formed in the same manner as in Example 1 were disposed between the unit conductors 1 in the direction of the circumference of the support member 4 but in the outside of the outermost circumference of the unit conductors 1 in the radial direction of the support member 4 in Example 2. Further, non-magnetic materials were disposed between the magnetic members 3 and the support member 4.

The self magnetic field distribution (average) in section of the unit conductors 1 was 45 gausses in the direction perpendicular to the tape surface and 375 gausses in the direction parallel with the tape surface when the current value was 10000 A. The critical current value calculated on the basis of the load line in FIG. 6 was 13890 A. That is, the critical current value was increased by 22% compared with the case where no magnetic member 3 was provided between the unit conductors 1.

Although the aforementioned examples have been described about the case where a soft iron piece was used as each of the magnetic members 3, the present invention can be applied also to the case where a material formed by hardening a mixture of a powder-like magnetic material as a base material and a binder resin is used as each of the magnetic members 3. In this case, each of the magnetic members 3 can be shaped freely, so that gaps between the unit conductors 1 can be entirely filled with the magnetic members 3. Furthermore, the permeability of the magnetic members 3 can be adjusted easily by change of the mixture proportion of the powder magnetic material and the binder resin, so that magnetic members 3 having optimum permeability can be obtained in accordance with various configurations of superconducting leads within the scope of the present invention. Accordingly, the magnetic field component in the direction perpendicular to the tape surface can be suppressed effectively.

Although the aforementioned examples have been described about the case where the cylindrical support member has a constant radius along the axial direction of the support member, the present invention can be applied also to the case where the cylindrical support member is tapered so that the radius changes along the axial direction of the support member. Particularly in the case where the support member is tapered so that the radius in the high-temperature end side is larger than the radius in the low-temperature end side, the entrance of heat into the low-temperature end side through the support member can be reduced more effectively because the sectional area of the support member decreases as the position approaches the low-temperature end.

As described above, according to the present invention, provided is a superconducting current lead in which a plurality of unit conductors serving as current paths and each formed from a tape-like oxide superconducting wire are disposed on a cylindrical support member so that a tape surface of the superconducting wire is made parallel with a circumferential direction in a cylindrical coordinate system, and magnetic members are disposed between the plurality of unit conductors. Accordingly, the deterioration of the critical current value caused by a self magnetic field is suppressed, so that a superconducting current lead allowed to be subjected to stable current conduction is obtained.

What is claimed is:

1. A superconducting current lead comprising:

a cylindrical support member, said cylindrical support member being made from a non-magnetic material, a plurality of unit conductors serving as current paths and formed of a plurality of tape-like oxide superconducting wires, each of said unit conductors being disposed on said cylindrical support member, a tape surface of said superconducting wire being in parallel with a circumferential direction in a cylindrical coordinate system, and a plurality of magnetic members, each of which are disposed on said cylindrical support member between said unit conductors.

2. A superconducting current lead as claimed in claim 1, wherein said tape-like oxide superconducting wire comprises an oxide superconductor core and a metal sheath, said metal sheath being made of a material selected from a group consisting of silver and a silver alloy containing gold.

3. A superconducting current lead as claimed in claim 1, wherein said cylindrical support member has a plurality of flat surfaces chamfered therein.

4. A superconducting current lead as claimed in claim 1, wherein said cylindrical support member defines a plurality of grooves, said grooves having a flat bottom surface.

5. A superconducting current lead as claimed in claim 1, wherein said cylindrical support member is made from materials having a thermal conductivity of less than or equal to about 1 W/(m–K).

6. A superconducting current lead as claimed in claim 1, wherein said unit conductors are disposed on said cylindrical support member with an adhesive agent provided between said unit conductor and said cylindrical support member.

7. A superconducting current lead as claimed in claim 1, wherein said unit conductors are disposed on an outer surface of said cylindrical support member with a binding tape wound around an outer circumference of said unit conductors.

8. A superconducting current lead comprising:

a cylindrical support member, a plurality of unit conductors serving as current paths and formed of a plurality of tape-like oxide superconducting wires, each of said unit conductors being disposed on said cylindrical support member, a tape surface of said superconducting wire being in parallel with a circumferential direction in a cylindrical coordinate system, each of said unit conductors having an inner circumference and an outer circumference, and a plurality of magnetic members, each of which are disposed between said unit conductors, wherein said plurality of magnetic members are entirely disposed radially outside of said outer circumference of said unit conductors.

9. A superconducting current lead as claimed in claim 8, wherein said tape-like oxide superconducting wire comprises an oxide superconductor core and a metal sheath, said metal sheath being made of a material selected from a group consisting of silver and a silver alloy containing gold.

10. A superconducting current lead as claimed in claim 8, wherein said cylindrical support member has a plurality of flat surfaces chamfered therein.

11. A superconducting current lead as claimed in claim 8, wherein said cylindrical support member defines a plurality of grooves, said grooves having a flat bottom surface.

12. A superconducting current lead as claimed in claim 8, wherein said cylindrical support member is made from materials having a thermal conductivity of less than or equal to about 1 W/(m–K).

13. A superconducting current lead as claimed in claim 8, wherein said unit conductors are disposed on said cylindrical support member with an adhesive agent provided between said unit conductor and said cylindrical support member.

14. A superconducting current lead as claimed in claim 8, wherein said unit conductors are disposed on an outer surface of said cylindrical support member with a binding tape wound around an outer circumference of said unit conductors.

15. A superconducting current lead as claimed in claim 8, wherein said cylindrical support member is made from a non-magnetic material.

* * * * *